(12) United States Patent
Kamiyama et al.

(10) Patent No.: US 10,542,081 B2
(45) Date of Patent: Jan. 21, 2020

(54) APPARATUS, DESIGN METHOD, AND RECORDING MEDIUM

(71) Applicants: NIPPON TELEGRAPH AND TELEPHONE CORPORATION, Chiyoda-ku (JP); OSAKA UNIVERSITY, Suita-shi (JP)

(72) Inventors: Noriaki Kamiyama, Musashino (JP); Yousuke Takahashi, Musashino (JP); Keisuke Ishibashi, Musashino (JP); Kohei Shiomoto, Musashino (JP); Yuichi Ohsita, Suita (JP); Masayuki Murata, Suita (JP)

(73) Assignees: NIPPON TELEGRAPH AND TELEPHONE CORPORATION, Chiyoda-ku (JP); OSAKA UNIVERSITY, Suita-shi (JP)

( * ) Notice: Subject to any disclaimer, the term of this patent is extended or adjusted under 35 U.S.C. 154(b) by 123 days.

(21) Appl. No.: 15/549,192

(22) PCT Filed: Feb. 5, 2016

(86) PCT No.: PCT/JP2016/053487
§ 371 (c)(1),
(2) Date: Aug. 7, 2017

(87) PCT Pub. No.: WO2016/132933
PCT Pub. Date: Aug. 25, 2016

(65) Prior Publication Data
US 2018/0034900 A1 Feb. 1, 2018

(30) Foreign Application Priority Data
Feb. 20, 2015 (JP) ................................. 2015-031523

(51) Int. Cl.
*H04L 12/721* (2013.01)
*H04L 29/08* (2006.01)
(Continued)

(52) U.S. Cl.
CPC .......... *H04L 67/101* (2013.01); *H04L 41/142* (2013.01); *H04L 45/124* (2013.01);
(Continued)

(58) Field of Classification Search
None
See application file for complete search history.

(56) References Cited

U.S. PATENT DOCUMENTS

| | | | | |
|---|---|---|---|---|
| 2005/0193113 A1* | 9/2005 | Kokusho | ............... | G06F 9/5083 709/225 |
| 2005/0216227 A1* | 9/2005 | Warrior | .................. | H04L 45/00 702/181 |
| 2014/0045475 A1* | 2/2014 | Anthony, Jr. | ....... | H04L 67/2842 455/418 |

FOREIGN PATENT DOCUMENTS

| | | |
|---|---|---|
| JP | 2010-57107 A | 3/2010 |
| JP | 2010-199842 A | 9/2010 |

OTHER PUBLICATIONS

International Search Report dated Mar. 15, 2016 in PCT/JP2016/053487 filed Feb. 5, 2016.

(Continued)

*Primary Examiner* — Joshua Joo
(74) *Attorney, Agent, or Firm* — Oblon, McClelland, Maier & Neustadt, L.L.P.

(57) ABSTRACT

A design apparatus is provided for designing a probability that a delivery server or a delivery route is selected for content delivery in response to a delivery request from a user. The design apparatus receives, as input parameter values, a parameter related to a network and an estimated amount of demand for delivery requests generated by users (Continued)

for content, and designs a selection probability that a cache server is selected as a delivery server for content delivery or a selection probability that a delivery route is selected, using model predictive control. The model predictive control uses an objective function for reducing the number of excessive delivery requests, each of which is a delivery request generated by a user for a content item and then rejected, and said delivery route is a combination of the delivery server and a delivery path on which the content is delivered by the delivery server.

7 Claims, 5 Drawing Sheets

(51) Int. Cl.
*H04L 12/24* (2006.01)
*H04L 12/717* (2013.01)

(52) U.S. Cl.
CPC .......... *H04L 45/42* (2013.01); *H04L 67/1097* (2013.01); *H04L 67/2842* (2013.01); *H04L 41/147* (2013.01)

(56) References Cited

OTHER PUBLICATIONS

Poese, Ingmar et al., "Improving Content Delivery Using Provider-aided Distance Information," ACM IMC, 2010, 13 pages.
Poese, Ingmar et al., "Enabling Content-aware Traffic Engineering," ACM SIGCOMM Computer Communication Review, vol. 42, No. 5, 2012, 7 pages.

* cited by examiner

APPARATUS, DESIGN METHOD, AND RECORDING MEDIUM

TECHNICAL FIELD

The present invention relates to a design apparatus, a design method, and a recording medium. Specifically, the present invention relates to a design apparatus, a design method, and a recording medium for designing a probability of selecting a delivery server or a delivery route used for content delivery in response to a delivery request from a user in a CDN (Content Delivery Network), in which content is delivered using cache servers which are distributed among a plurality of nodes in the NW (network).

BACKGROUND ART

Over the Internet, a state of each flow is not managed in the network and routing is performed based on a reception address. In a single AS (Autonomous System) managed by each ISP (Internet Service Provider), a packet is transferred on a path in which a total sum of fixed link weights is the smallest according to OSPF (Open Shortest Path First). Since a transfer rate is autonomously determined by a transmission host without flow admission control, link congestion may occur in principle. In order to maintain proper communication quality, one of the key issues for an ISP is to design and manage a NW so that loads of all the links forming the NW are below a proper level. The link load always varies depending on fluctuations in traffic matrix demand and path changes due to various failures. Accordingly, many path control methods are under discussion for distributing link loads by dynamically configuring paths through which packets flow so that a link with a low usage rate is actively used.

Recently, most of the Internet traffic is occupied by HTTP (Hypertext Transfer Protocol) traffic used for Web services. For example, according to the traffic analysis measured on backbone links between Japan and the United States of America from 2006 to 2008, about 60% of traffic is occupied by HTTP packets. In addition, the amount of traffic by UGC (User-Generated Content) such as YouTube (registered trademark) and rich content such as VoD (Video on Demand) grow rapidly. Most of the Internet traffic is occupied by these types of content delivery. Content is typically delivered using a CDN operated by a CDN operator. For example, 74% of the top 1,000 sites in the number of access counts use a CDN. A CDN aims to improve user quality and reduce the amount of traffic in the NW by copying content in a plurality of cache servers distributed over the NW and delivering the content from the cache servers rather than from the original server. Accordingly, the location of an originating node of a delivery flow generated for content delivery is determined according to a content placement scheme and a server selection scheme, and thus user quality and the amount of traffic in the NW are greatly affected by these schemes. A CDN is operated by a CDN operator such as Akamai which is independent of an ISP, and content is delivered from a cache server in an application layer in an overlaid manner. Thus, it is difficult for the ISP to obtain information about the server selection scheme and the content placement scheme. For this reason, path control by the ISP and server selection (or content placement) by the CDN operator are independently performed.

Considerable research has been made for controlling a packet transfer path by an ISP. For example, Forts et al. propose a method of designing link weights for OSPF to minimize a total sum of link costs defined as a function of the amount of traffic which flows through links. Benson et al. propose a method of controlling paths with shorter periodicity based on a short-term prediction of a traffic matrix. Danna et al. formulate, as a linear programming problem, a problem associated with appropriate path control in consideration of a trade-off between fairness of a bandwidth allocated to a user and a usage efficiency of network resources. Kandula et al. propose a method of adaptively determining a path based on a throughput measurement value. In addition, several schemes for controlling a path with a finer degree than a destination address have been proposed. For example, Elwalid et al. focus on MPLS (Multi-Protocol Label Switching) and formulate, as a linear programming problem, a problem of optimally designing LSPs (Label Switched Paths) to minimize the total link cost. Hong et al. and Jain et al. propose a TE (Traffic Engineering) scheme for switching paths in a short period of time with a finer degree. While these schemes assume that an ISP performs path control, a scheme for optimally selecting a path by an end user according to online optimization based on actual measurement information has been also considered. Research for analyzing various path control schemes from the viewpoint of quality of user experience has been also made.

Various research has been also made for a server selection scheme in which a CDN operator selects a server from which content is delivered in response to a delivery request. For example, Poese et al. propose that a CDN operator can appropriately select a server when an ISP provides information about the network state to the CDN operator. In addition to selection of the server, research for optimizing a location of a source server by controlling where content is cached have been also made. For example, Applegate et al. formulate, as a mixed integer programming problem, a problem of determining placement of each content item to minimize the amount of total traffic which flows in the network under constraints of a cache capacity and a link bandwidth. Tang et al. propose a content placement design method for minimizing a replication cost for content placement under constraints of user quality.

For these techniques, refer to Non-Patent Documents 1 and 2.

However, path control by an ISP has an influence on effects of server selection by a CDN operator and server selection by the CDN operator also has an influence on effects of path control by the ISP. In considering the respective control schemes by the ISP and the CDN operator, it is necessary to consider the influences on effects of control by the other party. For example, DiPalantino et al. model both strategies using a game theory and analyze a balance to be realized. Research for cooperatively selecting a server by an ISP and a CDN operator has been also made. For example, Poese et al. mention that an address of a delivery server replied by a DNS (Domain Name System) upon content delivery varies, and a response time will be improved when an ISP selects a server. Frank et al. propose a method of exchanging information necessary to cooperatively select a server between a CDN operator and an ISP.

Jiang et al. analyze, provided that path control by an ISP and server selection by a CDN operator are independently performed, to what extent an optimum state can be approached by exchanging information with each other.

PRIOR-ART DOCUMENTS

Non-Patent Documents

[Non-Patent Document 1] I. Poese, B. Frank, B. Ager, G. Smaragdakis, and A. Feldmann, Improving Content Delivery Using Provider-aided Distance Information, ACM IMC 2010.

[Non-Patent Document 2] I. Poese, B. Frank, G. Smaragdakis, S. Uhlig, A. Feldmann, and B. Maggs, Enabling Content-aware Traffic Engineering, ACM SIGCOMM Computer Communication Review, Vol. 42, NO. 5, pp. 22-28, 2012.

DISCLOSURE OF INVENTION

Problem(s) to be Solved by the Invention

As described above, various research has been made for independently performing appropriate path control by an ISP and appropriate server selection (or content placement) by a CDN operator. However, path control by an ISP has an influence on effects of server selection by a CDN operator and server selection by the CDN operator also has an influence on effects of path control by the ISP. Thus, it is necessary to consider the influences which the respective control schemes by the ISP and the CDN operator have on effects of control by the other party.

Recently, there is a growing trend that a large content provider such as Google and a Tier-1 ISP such as AT&T operate a CDN on their own. In addition, a scheme for appropriately performing path control and server selection with cooperation between an ISP and a CDN operator while exchanging information with each other has been also proposed. In this manner, an environment is maturing for simultaneously optimizing delivery paths and server selection in content delivery.

In the documents by Poese et al. and Frank et al., which describe that an ISP and a CDN operator cooperatively select a server, it is proposed that the ISP selects a server. However, these documents do not consider that the ISP simultaneously performs path control.

Since the amount of demand and popularity for each content item in content delivery will significantly change over time, for purpose of optimizing delivery paths and server selection, it is necessary to realize adaptive control for dynamically-changing demand. Accordingly, it is preferable that future demand can be accurately estimated. Although a scheme for predicting future movements in content popularity has been proposed, it is difficult to accurately predict future movements. Thus, it will be effective that various types of control can be performed in conjunction with traffic prediction in consideration of a prediction error.

In the document by Jiang et al., total optimization at a single point in time is proposed. However, it is difficult to apply it to a real network in which a traffic matrix continues to change for a long time into the future. In order to realize a proper optimization level at a plurality of points in time in which prediction of future traffic demand is difficult, it is preferable to realize a scheme for repeatedly performing an optimization process on a time series.

It is an object of the present invention to reduce a frequency with which a delivery request from a user is rejected when delivery demand from users changes over time in a CDN and to improve a CDN service.

Means for Solving the Problem(s)

In one aspect of the present invention, there is provision for a design apparatus for designing a probability that a delivery server or a delivery route is selected for content delivery in response to a delivery request from a user, when content is delivered using cache servers distributed among a plurality of nodes in a network, including:

a parameter input unit configured to receive, as input parameter values, a parameter related to the network and an estimated amount of demand for delivery requests generated by users for content;

a selection probability design unit configured to design, based on the input parameter values received by the parameter input unit, a selection probability that a cache server is selected as the delivery server or a selection probability that a delivery route is selected, using model predictive control, so as to reduce an excessive delivery request that is a delivery request generated by a user for a content item and then rejected, wherein the delivery route is a combination of the delivery server and a delivery path on which the content is delivered by the delivery server; and a selection probability output unit configured to output the selection probability of the cache server or the selection probability of the delivery route, designed by the selection probability design unit.

In another aspect of the present invention, there is provision for a design method in a design apparatus for designing a probability that a delivery server or a delivery route is selected for content delivery in response to a delivery request from a user, when content is delivered using cache servers distributed among a plurality of nodes in a network, including the steps of:

receiving, as input parameter values, a parameter related to the network and an estimated amount of demand for delivery requests generated by users for content;

designing, based on the received input parameter values, a selection probability that a cache server is selected as the delivery server or a selection probability that a delivery route is selected, using model predictive control, so as to reduce an excessive delivery request that is a delivery request generated by a user for a content item and then rejected, wherein the delivery route is a combination of the delivery server and a delivery path on which the content is delivered by the delivery server; and outputting the designed selection probability of the cache server or the designed selection probability of the delivery route.

In another aspect of the present invention, there is provision for a recording medium for recording a program which, for designing a probability that a delivery server or a delivery route is selected for content delivery in response to a delivery request from a user, when content is delivered using cache servers distributed among a plurality of nodes in a network, causes a computer to function as:

a parameter input unit configured to receive, as input parameter values, a parameter related to the network and an estimated amount of demand for delivery requests generated by users for content;

a selection probability design unit configured to design, based on the input parameter values received by the parameter input unit, selection probability that a cache server is selected as the delivery server or a selection probability that a delivery route is selected, using model predictive control, so as to reduce an excessive delivery request that is a delivery request generated by a user for a content item and then rejected, wherein the delivery route is a combination of the delivery server and a delivery path on which the content is delivered by the delivery server; and a selection probability output unit configured to output the selection probability of the cache server or the selection probability of the delivery route, designed by the selection probability design unit.

Advantageous Effect of the Invention

According to the present invention, it is possible to reduce a frequency with which a delivery request from a user is rejected when delivery demand from users changes over time in a CDN and to improve a CDN service.

DETAILED DESCRIPTION OF THE PREFERRED EMBODIMENTS

Embodiments of the present invention are described below with reference to the drawings.

In an embodiment of the present invention, there is described a solution to design a probability that a delivery server is selected or a probability that a delivery route, which is a combination of the delivery server and a delivery path, is selected for content delivery in response to a delivery request from a user, so as to reduce excessive delivery requests, which are rejections of delivery requests, in a CDN where content is delivered using cache servers distributed among a plurality of nodes in the network.

<Apparatus Configuration>

Figure 1:
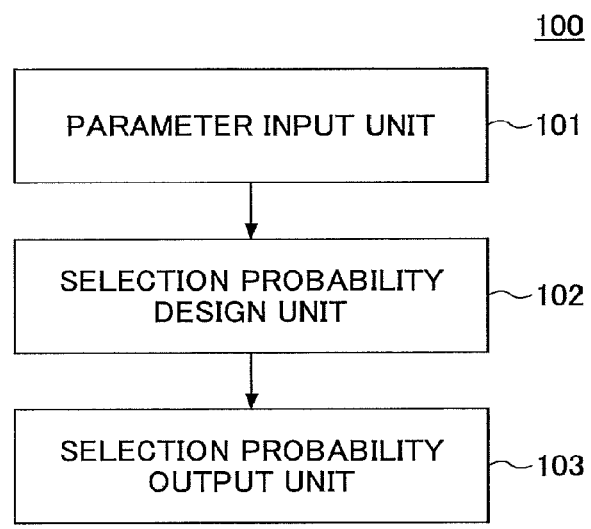
FIG. 1 illustrates a functional block diagram of a design apparatus according to an embodiment of the present invention.

FIG. 1 illustrates a functional block diagram of a design apparatus 100 according to an embodiment of the present invention. The design apparatus 100 is an apparatus for designing a probability that a delivery server is selected for content delivery in response to a delivery request from a user so as to reduce an excessive delivery request, which is a rejection of a delivery request, in a CDN where content is delivered using cache servers distributed among a plurality of nodes in the network. The design apparatus 100 is also an apparatus for designing a probability that a delivery route, which is a combination of the delivery server and a delivery path, is selected so as to reduce an excessive delivery request, which is a rejection of a delivery request.

Figure 2:
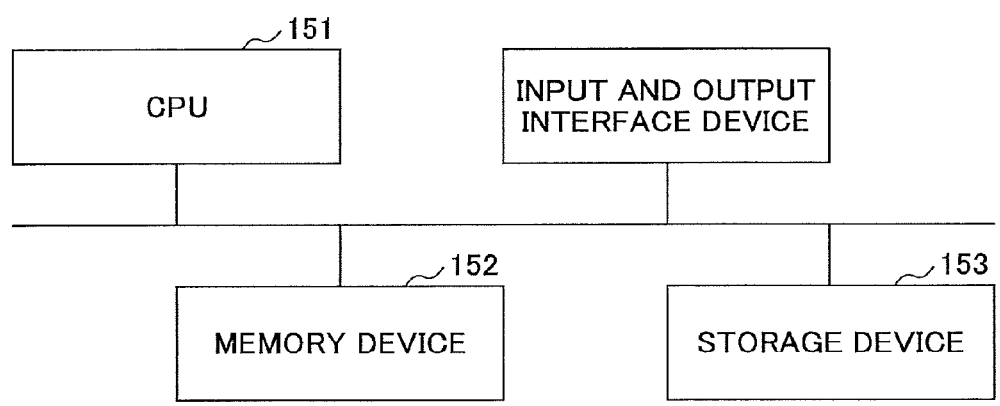
FIG. 2 illustrates an example of a hardware configuration of a design apparatus according to an embodiment of the present invention.

FIG. 2 illustrates an example of a hardware configuration of the design apparatus 100 according to an embodiment of the present invention. The design apparatus 100 may be a computer including a processor 151 such as a CPU (Central Processing Unit), a memory device 152 such as a RAM (Random Access Memory) or a ROM (Read Only Memory), a storage device 153 such as a hard disk, and so on. For example, functions and operations of the design apparatus 100 are realized when the CPU processes data and executes a program stored in the storage device 153 or the memory device 152.

The design apparatus 100 includes a parameter input unit 101, a selection probability design unit 102, and a selection probability output unit 103.

The parameter input unit 101 receives input parameter values needed to design a selection probability of a delivery server or a delivery route using MPC (Model Predictive Control). Specifically, the parameter input unit 101 receives a parameter related to the network and an estimated amount of demand for delivery requests generated by users for content.

The selection probability design unit 102 designs, based on the input parameter values received by the parameter input unit 101, a selection probability that a cache server is selected as a delivery server using model predictive control so as to reduce an excessive delivery request that is a delivery request generated by a user for a content item and then rejected. The selection probability design unit 102 may design not only the selection probability of the cache server but also a delivery route through which the delivery server delivers content to a user. In this case, the selection probability design unit 102 designs a selection probability of the delivery route, which is a combination of the delivery server and a delivery path, so as to reduce an excessive delivery request that is a delivery request generated by a user for a content item and then rejected.

The selection probability output unit 103 outputs the selection probability of the cache server or the selection probability of the delivery route, designed by the selection probability design unit 102.

Figure 3:
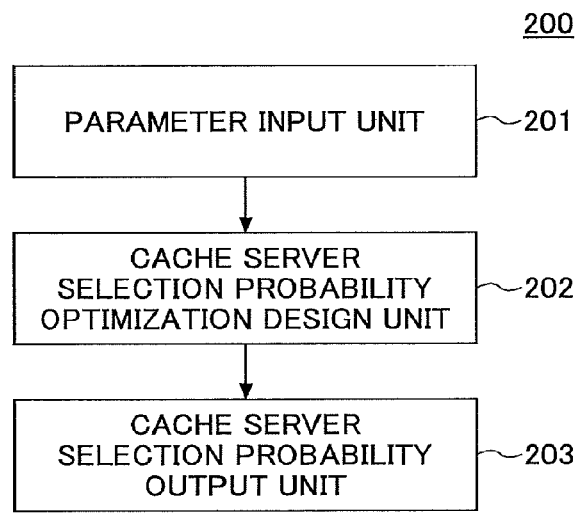
FIG. 3 illustrates a functional block diagram of a delivery server selection probability optimization design apparatus according to an embodiment of the present invention.

The design apparatus 100 illustrated in FIG. 1 may be configured as a delivery server selection probability optimization design apparatus 200 as illustrated in FIG. 3 for optimally designing a probability that a delivery server is selected for content delivery in response to a delivery request from a user, so as to minimize a frequency with which the delivery request is rejected because of exceeding a capacity of a cache server, in other words, because of exceeding a delivery capability of the cache server.

FIG. 3 illustrates a functional block diagram of the delivery server selection probability optimization design apparatus 200 according to an embodiment of the present invention. The delivery server selection probability optimization design apparatus 200 includes a parameter input unit 201, a cache server selection probability optimization design unit 202, and a cache server selection probability output unit 203. The cache server selection probability optimization design unit 202 may reduce the number of excessive delivery requests while reducing an average number of hops of delivery flows and stabilizing a variation of the selection probability. In other words, the cache server selection probability optimization design unit 202 may simultaneously optimize an objective function $J_s$ for reducing the number of excessive delivery requests, an objective function $J_h$ for reducing the average number of hops of the delivery flows, and an objective function $J_{v,p}$ for stabilizing the variation of the selection probability of the cache server.

The parameter input unit 201 receives, as input parameter, a parameter related to content in the network, a parameter related to the cache servers, and an estimated amount of demand for delivery requests generated by users for content. Specifically, the following parameters are input from the parameter input unit 201:

the number of content items M,
the number of nodes N,
a prediction horizon H for MPC,
a cache server delivery capacity $C_{c,s}$ of a cache server s,
the estimated amount of demand $\hat{d}_{u,m,t}$ of the amount of delivery demand $d_{u,m,t}$ generated by a user u for a content item m in a timeslot t,
a group of cache servers $S_{m,t}$ which keep possession of the content item m in the timeslot t,
a group of candidate paths $R_{s,u}$ from the cache server s to the user u,
a hop length $h_{s,u,k}$ from the cache server s to the user u in a timeslot k (t+1<=k<=t+H),
a weight parameter $w_h$ for the objective function $J_h$ relative to the objective function $J_s$, and
a weight parameter $w_{v,p}$ for the objective function $J_{v,p}$ relative to the objective function $J_s$.

The cache server selection probability optimization design unit 202 optimally designs the selection probability $p_{u,m,k}(s)$ of the cache server s based on the parameter values input from the parameter input unit 201, and then the cache server selection probability output unit 203 outputs the design value of $p_{u,m,k}(s)$.

Figure 4:
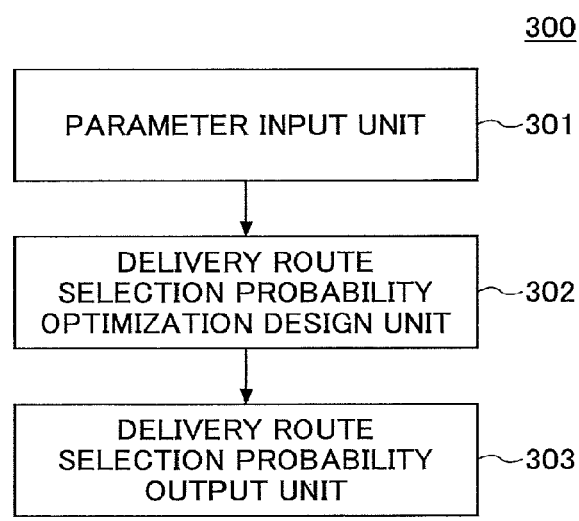
FIG. 4 illustrates a functional block diagram of a delivery route selection probability optimization design apparatus according to an embodiment of the present invention.

The design apparatus 100 illustrated in FIG. 1 may be configured as a delivery route selection probability optimization design apparatus 300 as illustrated in FIG. 4 for optimally designing a probability that a delivery server is selected for content delivery in response to a delivery request from a user together with a delivery path through which the delivery server delivers content to the user, so as to minimize a frequency with which the delivery request is rejected.

FIG. 4 illustrates a functional block diagram of the delivery route selection probability optimization design apparatus 300 according to an embodiment of the present invention. The delivery route selection probability optimization design apparatus 300 includes a parameter input unit 301, a delivery route selection probability optimization design unit 302, and a delivery route selection probability output unit 303. The delivery route selection probability optimization design unit 302 may reduce the number of excessive delivery requests while reducing a total number of delivery flows passing through links, reducing an average number of hops of the delivery flows, and stabilizing a variation of the selection probability. In other words, the delivery route selection probability optimization design unit 302 may simultaneously optimize an objective function $J_s$ for reducing the number of excessive delivery requests, an objective function $J_e$ for reducing the total number of delivery flows passing through the links, an objective function $J_h$ for reducing the average number of hops of the delivery flows, and an objective function $J_{v,\tilde{p}}$ for stabilizing the variation of the selection probability of the delivery route.

The parameter input unit 301 receives, as input parameter, a parameter related to content in the network, a parameter related to the cache servers, an estimated amount of demand for delivery requests generated by users for content, and a parameter related to the links. Specifically, the following parameters are input from the parameter input unit 301:

the number of content items M,
the number of nodes N,
a prediction horizon H for MPC,
a cache server delivery capacity $C_{c,s}$ of a cache server s,
a link transfer capacity $C_{L,e}$ of a link e,
a group of delivery routes $\Phi_{u,m,t}$ between a user u and a content item m in a timeslot t,
the estimated amount of demand $\hat{d}_{u,m,t}$ of the amount of delivery demand $d_{u,m,t}$ generated by the user u for the content item m in the timeslot t,
a group of cache servers $S_{m,t}$ which keep possession of the content item m in the timeslot t,
a group of candidate paths $R_{s,u}$ from the cache server s to the user u,
a binary variable $I_{s,u,t}(r,e)$ which is equal to one if a candidate route r from the cache server s to the user u includes the link e in the timeslot t,
a hop length $h_{s,u,k}$ from the cache server s to the user u in a timeslot k (t+1<=k<=t+H),
a weight parameter $w_e$ for the objective function $J_e$ relative to the objective function $J_s$,
a weight parameter $w_h$ for the objective function $J_h$ relative to the objective function $J_s$, and
a weight parameter $w_{v,\tilde{p}}$ for the objective function $J_{v,\tilde{p}}$.

The delivery route selection probability optimization design unit 302 optimally designs the selection probability $\tilde{p}_{u,m,k}(s,r)$ of the delivery route based on the parameter values input from the parameter input unit 301, and then the delivery route selection probability output unit 303 outputs the design value of $\tilde{p}_{u,m,k}(s,r)$.

A solution to select a delivery server and a solution to select a delivery route according to an embodiment of the present invention are described below in detail.

<Assumption>

In a CDN, a cache server (or an original server) for delivering content is selected in response to a content delivery request from a user, and then the content is delivered. In an embodiment of the present invention, it is assumed that delivery processing used by a typical CDN operator is performed prior to the delivery. Akamai is an example of the typical CDN operator.

Figure 5:
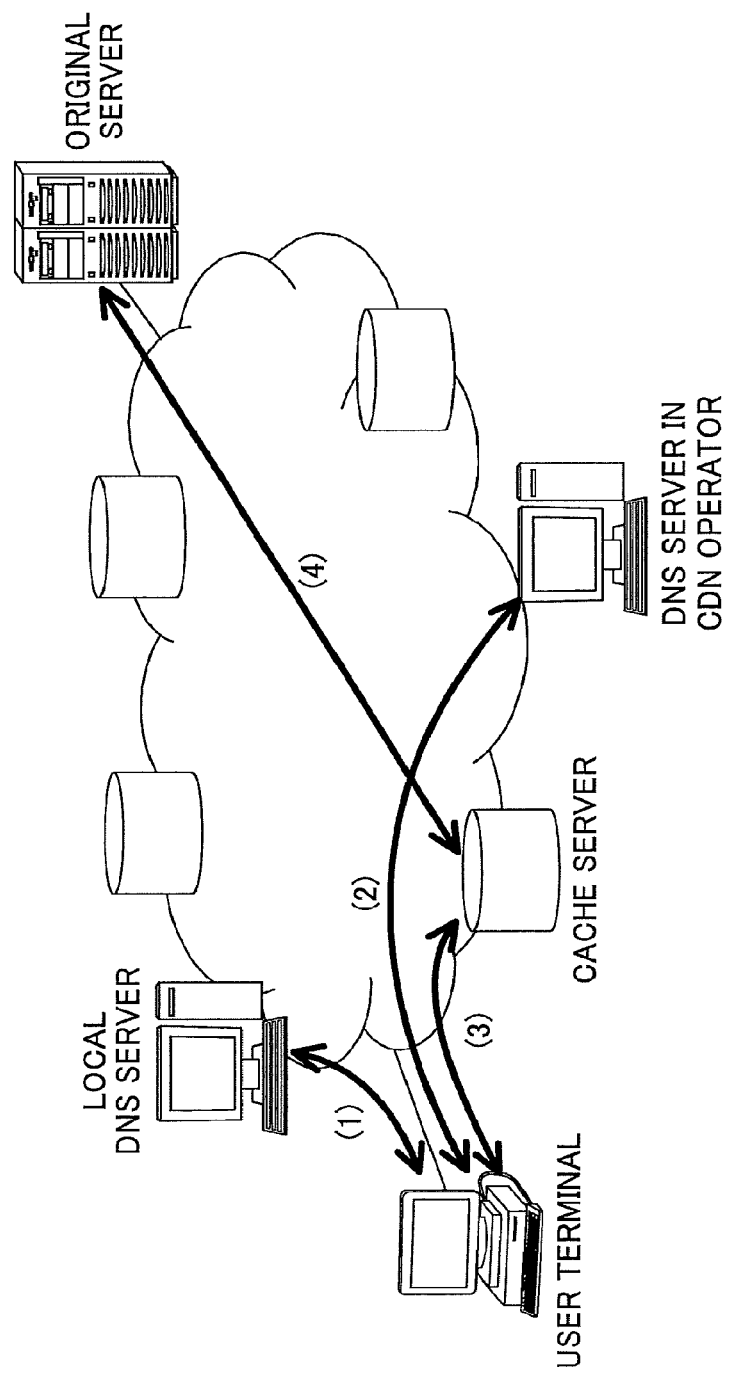
FIG. 5 illustrates a conceptual diagram of a CDN operation mechanism.

FIG. 5 illustrates a conceptual diagram of a CDN operation mechanism. In order for a user to obtain an IP address of a delivery source server according to a DNS, the user first queries a local DNS server for the IP address as illustrated in (1) in FIG. 5. When the requested content is cached in the local DNS server, the content is delivered from the local DNS server to the user terminal. When the content is not cached, the local DNS server responds to the user terminal indicating that the user terminal should query a DNS server in the CDN operator. The user terminal queries the DNS server in the CDN operator for an IP address of a delivery server as illustrated in (2) in FIG. 5. The DNS server in the CDN operator selects a cache server used for delivery and responds to the user terminal with the IP address of the cache server. A selection criterion of the cache server is determined by the CDN operator. Often, a cache server with a short measured response time or a cache server placed near the user terminal is selected.

The user terminal requests delivery of the content to the selected cache server as illustrated in (3) in FIG. 5. If the content is cached (cache hit), the content is delivered from the cache server. If the content is not cached (cache miss), the cache server requests to an original server which keeps possession of original content and obtains the content as illustrated (4) in FIG. 5. Then, the cache server caches the obtained content and delivers the content to the user terminal. When a cache capacity is insufficient, some of existing cached content items are deleted based on a certain policy, and then the newly obtained content is cached. LRU (least recently used) which deletes content with a maximum elapsed time since the content was last requested is often used as a policy to select content to be deleted.

It is assumed that discretization is applied to the whole system resulting in the unit of timeslot (TS) with a fixed time length T. The NW is assumed to have any topology formed by N nodes and E links managed by a single ISP. A transmission capacity (total count number of deliveries enabled for content transfer within each TS) of a link e is expressed as $C_{L,e}$. A group of candidate paths used for content delivery from a node i to a node j is defined as $R_{i,j}$. When content is delivered from the node i to the node j, a delivery path is determined by selecting any path r according to $r \in R_{i,j}$. A user accommodated by a node u is expressed as a user u. The user u includes a user which is directly accommodated by the node u and a user which is accommodated by a lower NW provided by the node u. The node u is a destination node of a content delivery flow for the user u.

It is assumed that M content items with the same size are provided in the whole NW and the amount of delivery demand generated by the user u for a content item m in a TS t (the number of requests generated in the TS t) is expressed as $d_{u,m,t}$. It is also assumed that an original server is installed in every node, each original content item is included only in any one of the nodes, the location of the original content item is always fixed, and the original content item m is placed in a node $o_m$. An original server and a cache server installed in the node n is expressed as an original server n and a cache server n, respectively, and the combination of the original server n and the cache server n is expressed as a server n. It is also assumed that throughput of each delivery flow is equal.

It is assumed that a cache server is installed in every node in the NW, a storage capacity (a maximum number of content items which can be cached) of a cache server s is expressed as $B_s$. A delivery processing capacity of each cache server and each original server is limited and an upper limit of a total count number of deliveries in which the cache server s can deliver content in each TS is expressed as $C_{C,s}$. When the cache server s selected in response to a delivery request from the user u for the content item m keeps possession of the content item m (cache hit), the delivery capacity of the cache server s is sufficient, and all the links included in the selected path r are sufficient, the content item m is delivered from the cache server s and thus a delivery flow is generated from the node s to the user u.

On the other hand, in the case of cache miss or in the case of exceeding the delivery capacity of the server or the link, when the delivery capacity of the original server $o_m$ of the content item m is sufficient, the content item m is delivered from the original server $o_m$, and thus a delivery flow is generated from the node $o_m$ to the node s and a delivery flow is also generated from the node s to the user u. Then, the content item m is newly cached in the cache server s. LRU is assumed to be used as a replacement scheme in the case of an insufficient cache capacity. In addition, when the delivery capacity of the server or the link from the original server $o_m$ is insufficient, the delivery request is rejected and the request that had been rejected is generated again, as an excessive delivery request, in a next TS. While content items included in each cache server dynamically vary, a group of cache servers which keep possession of the content item m at the start of the TS t is expressed as $S_{m,t}$.

<MPC (Model Predictive Control)>

MPC is similar to conventional system control in that parameters (inputs) of the system are optimized so as to bring actions (outputs) of the system close to a predetermined target. However, MPC optimizes the inputs in consideration of actions of the system not only at the current time but also in a predetermined time interval (prediction horizon) in the future. Specifically, when an output value in a TS k is expressed as $y_k$ and a target of the output value is expressed as $Y_k$, an input sequence u(t+1), u(t+2), . . . , u(t+H) which minimizes differences $J_1 = \Sigma_{k=t+1}^{t+H} \|y_k - Y_k\|^2$ between $y_k$ and the target over a time interval [t+1, t+H] corresponding to H steps in the future is derived in the current TS t, where $\|x\|$ represents an Euclidean norm of x.

For the optimization, it is necessary to predict the output $y_k$ when an input $x_k$ is provided in the TS t. The time-stepping relationship of the output when the input is provided is expressed as a system model and the following state space model is mainly used in view of a state $z_k$ of the system in each TS:

$$z_{k+1} = f(k, z_k, x_k)$$

$$y_k = g(k, z_k, x_k)$$

where f and g are functions representing relationships among the input, the output, and the state. However, an error may be included in the system model, and thus a predicted value $\hat{y}_k$ of the output based on the system model may also include an error. Since the prediction error becomes larger as later prediction is performed, only the immediate input $x_{t+1}$ among inputs $x_{t+1}, \ldots, x_{t+H}$ optimized in the prediction horizon [t+1, t+H] is actually input to the system. The subsequent inputs are determined by modifying the predicted value based on observation feedback and optimizing the inputs again. In addition, since the system may become unstable when the inputs are excessively modified with the effect of the prediction error, it is necessary to stabilize the system by stabilizing the amount of modification $\Delta x_k = x_k - x_{k-1}$ of the input in each TS. Specifically, in order to minimize the amount of modification $J_2 = \Sigma_{k=t+1}^{t+H} \|\Delta x_k\|$ of the inputs over the whole prediction horizon [t+1, t+H] together with $J_1$, a parameter w representing a balance between $J_1$ and $J_2$ is introduced to derive an input sequence $x_{t+1}, x_{t+2}, \ldots, x_{t+H}$ which minimizes $J_1 + wJ_2$. The larger the weight parameter w is, the more the amount of modification of the input is stabilized with the current input being maintained.

Figure 6:
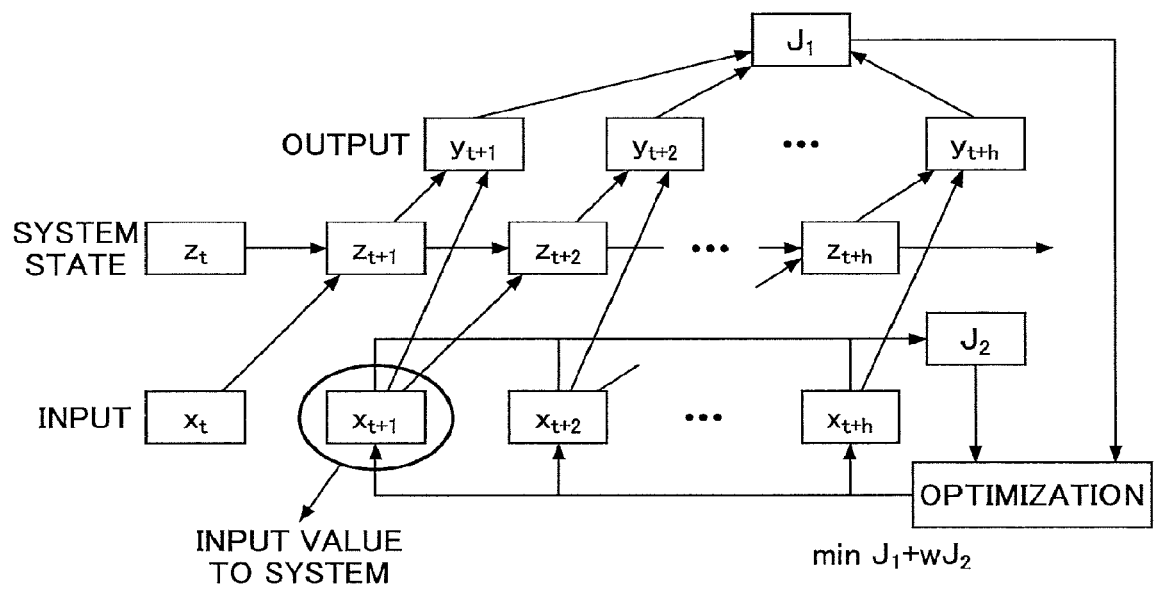
FIG. 6 illustrates a conceptual diagram of an optimization flow of model predictive control.

FIG. 6 illustrates a diagram of an optimization process of MPC. A system state $z_{t+1}$ in a TS t+1 is determined by a system state $z_t$ and an input $x_t$ in the TS t which is the previous timeslot. An output $y_{t+1}$ in the TS t+1 is externally provided and determined based on the system state $z_{t+1}$ and an input $x_{t+1}$ in the TS t+1. Thus, it is possible to recursively calculate an output $y_k$ in a TS k in the range of t+1<=k<=t+H when an input $x_k$ in the TS k is provided, and thus the optimization objective function $J_1 + wJ_2$ is obtained. In addition, a nonlinear programming problem which minimizes the objective function is derived for $x_t$ within the range of t+1<=k<=t+H and an input value $x_{t+1}$ in the TS t+1 is input to the system.

<Application of MPC to Optimal Control of Delivery Server Selection>

A specific example where MPC is applied to optimal control of delivery server selection in the cache server selection probability optimization design unit 202 is described below.

The system state $z_t$ of MPC is the amount of delivery demand $d_{u,m,t}$ generated for content and is externally provided. Since $d_{u,m,k}$ (k>=t) is unknown at the start of the TS t, its estimated value $\hat{d}_{u,m,k}$ is used instead. Assuming that a delivery cache server used to deliver a content item m to a user u is deterministically selected, a problem of minimizing the optimization function of MPC results in an integer programming problem, and thus it is difficult to derive an optimal value of the input value $x_t$ in a short time. Thus, a delivery cache server is selected probabilistically rather than deterministically. Specifically, a cache server s is selected from cache servers $S_{m,t}$ with a probability $p_{u,m,t}(s)$ in response to a request for the content item m from the user u in the TS t. Accordingly, $p_{u,m,t}(s)$ is the input $x_t$ of MPC and the problem can be formulated as a nonlinear programming problem which minimizes the objective function in consideration of constraints of $\Sigma_{s \in S_{m,t}} p_{u,m,t}(s) = 1$ at the start of each TS. Therefore, a solution of $p_{u,m,t}(s)$ can be quickly obtained.

The objective to optimize delivery server selection in content delivery is to equalize loads of cache servers, to reduce the count number of excessive deliveries which are caused by congestion, and to reduce the hop lengths of the delivery flows. When the count number of excessive deliveries in the server s in the TS t−1 is expressed as $\zeta_{s,t-1}$, a total number of delivery flows $g_{s,t}$ from the server s in the TS t is calculated as follows:

$$g_{s,t} = \sum_{m=1}^{M} \sum_{u=1}^{N} \sum_{r \in R_{s,u}} \hat{d}_{u,m,t} p_{u,m,t}(s) + \zeta_{s,t-1}.$$

Using an operator $[x]^+$ which outputs x if x>0 and outputs 0 if x<=0, $\zeta_{s,t-1}$ can be calculated as $\zeta_{s,t-1} = [g_{s,t-1} - C_{C,s}]^+$. Then, an objective function $J_s$ associated with congestion in cache servers is defined as follows:

$$J_s = \sum_{k=t+1}^{t+H} \sum_{s=1}^{N} \zeta_{s,k}.$$

In addition, in order to simultaneously reduce an average hop length of the delivery flows, an objective function $J_h$ is defined as follows:

$$J_h = \sum_{k=t+1}^{t+H} \sum_{m=1}^{M} \sum_{u=1}^{N} \sum_{s \in S_{m,k}} h_{s,u,k} \hat{d}_{u,m,k} p_{u,m,k}(s),$$

where $h_{s,u,k}$ is a hop length of a delivery path from the server s to the node u in a TS k and the smallest number of hops is used herein. Furthermore, in order to stabilize the variation of $p_{u,m,t}(s)$, an objective function $J_{v,p}$ is defined as follows:

$$J_{v,p} = \sum_{k=t+1}^{t+H} \sum_{m=1}^{M} \sum_{u=1}^{N} \sum_{s \in S_{m,k}} |p_{u,m,k}(s) - p_{u,m,k-1}(s)|.$$

In order to simultaneously consider these three objective functions, real-valued parameters $w_h$ and $w_{v,p}$ respectively representing weights of $J_h$ and $J_{v,p}$ relative to $J_s$ are used to formulate $J_s + w_h J_h + w_{v,p} J_{v,p}$ and $p_{u,m,k}(s)$ for each TS k within the range of t+1<=k<=t+H at the end of the TS t is optimized according to the following nonlinear programming problem to minimize $J_s + w_h J_h + w_{v,p} J_{v,p}$:

$$\min \quad J_s + w_h J_h + w_{v,p} J_{v,p}$$
$$\text{s.t.} \quad \zeta_{s,t} = [g_{s,t-1} - C_{C,s}]^+, \forall s,$$
$$g_{s,t} = \sum_{m=1}^{M} \sum_{u=1}^{N} \sum_{r \in R_{s,u}} \hat{d}_{u,m,t} p_{u,m,t}(s,r) + \zeta_{s,t-1},$$
$$0 \le p_{u,m,t}(s) \le 1, \forall u, \forall m, \forall s,$$
$$\sum_{s \in S_{m,t}} p_{u,m,t}(s) = 1, \forall u, \forall m.$$

<Simultaneous Optimization of Delivery Server Selection and Path Selection Using MPC>

A specific example where MPC is applied to simultaneous optimization of delivery server selection and delivery path selection in the delivery route selection probability optimization design unit 302 is described below.

For convenience, the combination of a delivery path and a delivery cache server is referred to as a delivery route. In this example, a delivery route used in response to a delivery request for a content item m from a user u is optimally designed. A group of delivery routes between the user u and the content item m in a TS t is expressed as $\Phi_{u,m,t}$, and a delivery route with a delivery source s ($s \in S_{m,t}$) and a path r ($r \in R_{s,u}$) among the group of delivery routes is expressed as $\varphi_{u,m,t}(s,r)$.

Figure 7:
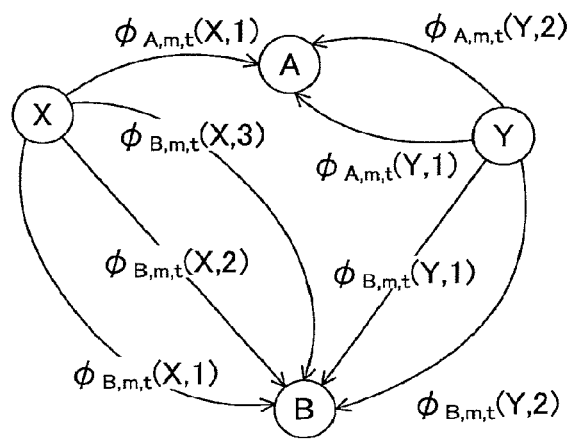
FIG. 7 illustrates an example of a group of delivery routes input to a delivery route selection probability optimization design apparatus according to an embodiment of the present invention.

FIG. 7 illustrates an example of delivery routes for a content item m between a user A and a user B, when the content item m is stored in a cache X and a cache Y. In this example, there is one delivery route $\varphi_{A,m,t}(X,1)$ from the cache X to the user A and there are two delivery routes $\varphi_{A,m,t}(Y,1)$ and $\varphi_{A,m,t}(Y,2)$ from the cache Y to the user A. Similarly, there are three delivery routes from the cache X to the user B and there are two delivery routes from the cache Y to the user B.

In this example, in order to quickly derive an optimal value of the input value $x_t$, a delivery route is also selected probabilistically rather than deterministically. Specifically, a delivery route $\varphi_{u,m,t}(s,r)$ is selected from delivery routes $\varphi_{u,m,t}$ with a probability $\tilde{p}_{u,m,t}(s,r)$ in response to a request for the content item m from the user u in the TS t. Accordingly, $\tilde{p}_{u,m,t}(s,r)$ is the input $x_t$ of MPC and the problem can be formulated as a nonlinear programming problem which minimizes the objective function in consideration of constraints of $\Sigma_{s \in S_{m,t}} \Sigma_{r \in R_{s,u}} \tilde{p}_{u,m,t}(s,r) = 1$ at the start of each TS. Therefore, a solution of $\tilde{p}_{u,m,t}(s,r)$ can be quickly obtained.

The objective to optimize delivery cache server selection and delivery path selection in content delivery is to reduce the amount of traffic flowing over the NW and to reduce the count number of excessive deliveries which are caused by congestion. In order to reduce the amount of traffic, it is necessary to reduce the hop lengths of the delivery flows. In order to reduce the count number of excessive deliveries, it is necessary to reduce loads of links and cache servers below a predetermined capacity. Path control of the delivery flows has an influence on the link loads and the hop lengths of the delivery flows. On the other hand, delivery server selection has an influence on the delivery server loads in addition to the link loads and the hop lengths of the delivery flows. For this reason, in order to design a selection probability of the combination of a delivery path and a delivery cache server, it is necessary to simultaneously reduce the link loads, the hop lengths of the delivery flows, and the delivery server loads over a prediction horizon [t+1, t+H].

When a binary variable, which is equal to one if a candidate route r from the node s to the node u includes a link e in the TS t, is expressed as $I_{s,u,t}(r,e)$ and the count number of excessive deliveries in the link e in the TS t−1 is expressed as $\eta_{e,t-1}$, a total number of delivery flows $f_{e,t}$ passing through the link e in the TS t is calculated as follows:

$$f_{e,t} = \sum_{m=1}^{M}\sum_{u=1}^{N}\sum_{s\in S_{m,t}}\sum_{r\in R_{s,u}} I_{s,u,t}(r,e)\hat{d}_{u,m,t}\tilde{p}_{u,m,t}(s,r) + \eta_{e,t-1},$$

where $\eta_{e,t-1}$ is calculated as $\eta_{e,t-1}=[f_{e,t-1}-C_{L,e}]^+$. Then, an objective function $J_e$ associated with link congestion is defined as follows:

$$J_e = \sum_{k=t+1}^{t+H}\sum_{e=1}^{E} \eta_{e,k}.$$

In order to stabilize the variation of $\tilde{p}_{u,m,t}$, an objective function $J_{v,\tilde{p}}$ is defined as follows:

$$J_{v,\tilde{p}} = \sum_{k=t+1}^{t+H}\sum_{m=1}^{M}\sum_{u=1}^{N}\sum_{s\in S_{m,k}}\sum_{r\in R_{s,u}} |\tilde{p}_{u,m,k}(s,r) - \tilde{p}_{u,m,k-1}(s,r)|.$$

In addition to the two objective functions $J_s$ and $J_h$, and their weights $w_e$, $w_{v,\tilde{p}}$ relative to $J_s$ are used to formulate $J_s+w_eJ_e+w_hJ_h+w_{v,\tilde{p}}J_{v,\tilde{p}}$ and $\tilde{p}_{u,m,k}(s,r)$ and for each TS k within the range of t+1<=k<=t+H at the end of the TS t is optimized according to the following nonlinear programming problem to minimize $J_s+w_eJ_e+w_hJ_h+w_{v,\tilde{p}}J_{v,\tilde{p}}$:

$$\min \quad J_s + w_eJ_e + w_hJ_h + w_{v,\tilde{p}}J_{v,\tilde{p}}$$
$$\text{s.t.} \quad \eta_{e,t} = [f_{e,t-1} - C_{L,e}]^+, \forall e,$$
$$\zeta_{s,t} = [g_{s,t-1} - C_{C,s}]^+, \forall s,$$
$$f_{e,t} = \sum_{m=1}^{M}\sum_{u=1}^{N}\sum_{s\in S_{m,t}}\sum_{r\in R_{s,u}}$$
$$I_{s,u,t}(r,e)\hat{d}_{u,m,t}\tilde{p}_{u,m,t}(s,r) + \eta_{e,t-1},$$
$$g_{s,t} = \sum_{m=1}^{M}\sum_{u=1}^{N}\sum_{r\in R_{s,u}} \hat{d}_{u,m,t}\tilde{p}_{u,m,t}(s,r) + \zeta_{s,t-1},$$
$$0 \leq \tilde{p}_{u,m,t}(s,r) \leq 1, \forall u, \forall m, \forall s, \forall r,$$
$$\sum_{s\in S_{m,t}}\sum_{r\in R_{s,u}} \tilde{p}_{u,m,t}(s,r) = 1, \forall u, \forall m.$$

<Performance Evaluation>

In the following, three delivery server selection schemes are considered which are a scheme (L: Local) of always selecting only a cache server s in response to a delivery request from a user u, a scheme (C: Cooperative) of selecting a cache server with a minimum hop length to the user u among all cache servers keeping possession of a copy of a requested content item m, and a scheme (M: MPC) of optimally selecting a delivery server using MPC. In addition, two path determination schemes are considered which are a scheme (S: Shortest) of always selecting a path with the shortest hop and a scheme (M: MPC) of optimizing paths using MPC. Thus, 3*2=6 cases as implementation patterns of a content delivery NW are compared. When each pattern is expressed according to a naming rule as (delivery server selection scheme)×(path determination scheme), the conventional CDN pattern corresponds to L×S, for example, and the patterns explained in the embodiment of the present invention correspond to M×S and M×M.

In order to compare performance evaluation results, only the pattern using MPC as a path determination scheme is briefly described. The pattern using MPC as a path selection scheme corresponds to the case where an ISP does not operate a CDN and performs control using MPC. In this case, a probability $\acute{p}_{s,u,t}(r)$ of selecting a path r ($r\in R_{s,u}$) as a delivery path in response to a request for delivery from a server s to a user u is to be designed. Since the ISP does not know a location in which each content item is cached or a delivery server selection policy used by the CDN operator, it is difficult to estimate the amount of traffic demand generated between each node pair. However, considering that a cache storing a content item requested by a user is selected in most cases, traffic is not generated in the NW in the case of a cache hit. Thus, considering that content is delivered from an original server $o_m$ to the user u in response to a delivery request for a content item m, $\acute{p}_{s,u,t}(r)$ is designed according to MPC. When an objective function $J_{v,\acute{p}}$ for the variation of $\acute{p}_{s,u,t}(r)$ is defined in a similar manner to $J_{v,p}$ and $J_{v,\tilde{p}}$, the objective function to be optimized is expressed as $w_eJ_e+w_hJ_h+w_{v,\acute{p}}J_{v,\acute{p}}$.

Figure 8A:
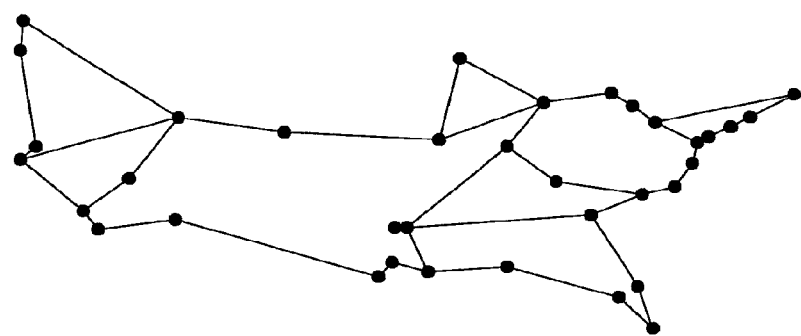
FIG. 8A illustrates a CAIS network topology used for performance evaluation of a design apparatus according to an embodiment of the present invention.
Figure 8B:
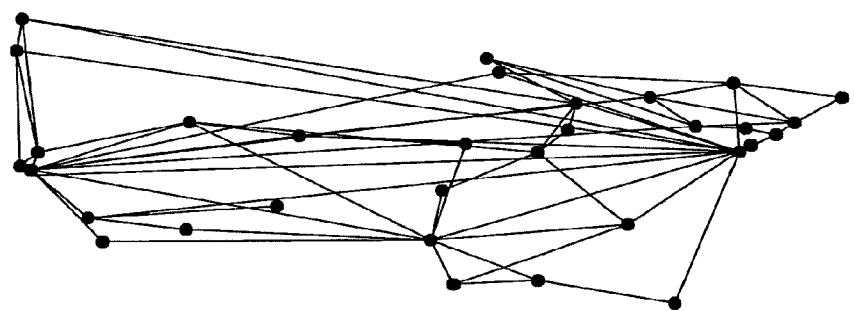
FIG. 8B illustrates a Verio network topology used for performance evaluation of a design apparatus according to an embodiment of the present invention.

Two U.S. NW topologies of commercial ISP backbones, CAIS and Verio, which are published on CAIDA are used for the evaluation. FIGS. 8A and 8B illustrate these two NW topologies. The numbers of nodes N included in the respective NWs are 37 and 35, the numbers of links E are 88 and 152, and the average numbers of node degrees are 2.38 and 4.11, respectively. Verio is higher in the node degrees than CAIS and includes a hub node with a high node degree. On the other hand, CAIS is lower in the node degrees and does not include a hub node. In Verio, it is possible to shorten a hop length between each node pair by going through the hub node. Thus, the average distance between nodes in Verio is 2.51, while the average distance between nodes in CAIS is 5.05 and is longer than Verio.

Additionally, content delivery requests are generated according to access log data collected in the commercial VoD service, Powerinfo VoD system provided by China Telecom. The log data include total of 20,921,657 delivery requests generated during seven months from June, 2004 to December, 2004. In the evaluation, the log data for ten days from the 162nd day to the 171st day are used and each delivery request is generated from a node which is randomly selected with a probability in proportion to a population ratio corresponding to the node. A simulation is started with the state in which no content item is cached in cache servers, data corresponding to the first three days are withdrawn from evaluation as a warm-up period, and data corresponding to the remaining seven days are used for the evaluation.

It is assumed that every node includes a cache server. Considering that the number of content items included in the log data for the evaluation is 7,500, a storage capacity of each cache server is determined as $B_s$=7,500/N. Also considering that a maximum view count per day during the seven days used for the evaluation of the log data is 5,700, a delivery capacity of each delivery server is determined as $C_{C,s}$=5,700*2/N and a transmission capacity of each link is determined as $C_{L,e}$=5,700*4/N. In addition, an original server $o_m$ for each content item is randomly determined at the start of the simulation with a probability in proportional to the population ratio corresponding to the node, and is fixed during the simulation.

The time length of the TS is defined as T=30 (min). When MPC is used for one or both of the path determination scheme and the delivery server selection scheme, the prediction horizon is defined as H=2 and each weight for the objective function is defined as $w_e$=0.5, $w_h$=$w_{v,p}$=$w_{v,\bar{p}}$=$w_{v,\hat{p}}$=0.001. In addition, it is assumed that demand is accurately predicted and thus the real value $d_{u,m,t}$ is used for the predicted value $\hat{d}_{u,m,t}$ of delivery demand. Then, in response to each delivery request from a node u (user u) for a content item m generated according to the access log data, a cache server, a delivery route, and a path are randomly selected according to $p_{u,m,t}(s)$, $\tilde{p}_{u,m,t}(s,r)$, and $\hat{p}_{u,m,t}(r)$, respectively. In this simulation, candidate paths $R_{i,j}$ are determined as three k-shortest paths (three paths with the shortest hop length) between a node pair i and j.

<Evaluation Result>

The six patterns are compared with respect to the average number of excessive delivery requests which are rejected among the generated delivery requests in each TS and the average hop length of delivery flows. Tables 1 and 2 summarize the average number of excessive delivery requests when the six patterns are used for the respective CAIS and Verio NWs.

TABLE 1

| PATH DETERMINATION SCHEME | DELIVERY SERVER SELECTION SCHEME | | |
|---|---|---|---|
| | Local (L) | Cooperate (C) | MPC (M) |
| Shortest (S) | 1548.1 | 3.69 | 7.59 |
| MPC (M) | 800.3 | 3.69 | 7.24 |

TABLE 2

| PATH DETERMINATION SCHEME | DELIVERY SERVER SELECTION SCHEME | | |
|---|---|---|---|
| | Local (L) | Cooperate (C) | MPC (M) |
| Shortest (S) | 1980.5 | 316.9 | 12.41 |
| MPC (M) | 985.4 | 316.9 | 11.7 |

The difference obtained when only the delivery server selection scheme is switched while using the same path determination scheme is significantly large compared to the difference obtained when only the path determination scheme is switched while using the same delivery server selection scheme, and thus it is understood that the delivery server selection scheme is a key factor to determine the average number of excessive delivery requests.

When the delivery server selection scheme is Local, a candidate cache server to be selected in response to each delivery request is limited to a node where the request is generated. Thus, compared to Cooperate and MPC in which a plurality of candidate nodes can be selected, the number of excessive delivery requests of Local is one or two orders of magnitude greater. When the delivery server selection scheme Cooperate is compared with the delivery server selection scheme MPC, according to Cooperate, a delivery server with the shortest hop length to the requested user is always selected among cache servers storing the content item in consideration of the cache state at the time of generating each delivery request. On the other hand, according to MPC, since a selection probability of a cache server is designed based only on content locations at the start of the TS, MPC does not select a server in consideration of content locations at the time of generating the request. For this reason, MPC requires a much longer period of time needed to grasp content locations over the whole NW compared to Cooperate, and thus it is expected that control workload is low while the number of excessive delivery requests will increase.

However, the evaluation result of Cooperate in CAIS is only slightly better than that of MPC. In Verio, on the other hand, the evaluation result of MPC is one order of magnitude smaller than that of Cooperate and significantly better. This is because Verio includes a hub node with a high node degree and the hop length between the hub node and another node is short, and according to Cooperate, there is a high probability that a cache server included in the hub node is selected as a delivery server and a load is concentrated on the cache server. Thus, when a hub-and-spoke NW with hub nodes is used, many cache servers are probabilistically selected and the delivery server selection scheme using MPC in which various servers are selected will be effective.

Table 3 and 4 summarize an average hop length of delivery flows when the six patterns are used for the respective CAIS and Verio NWs.

TABLE 3

| PATH DETERMINATION SCHEME | DELIVERY SERVER SELECTION SCHEME | | |
|---|---|---|---|
| | Local (L) | Cooperate (C) | MPC (M) |
| Shortest (S) | 3.93 | 1.99 | 2.14 |
| MPC (M) | 4.10 | 2.01 | 2.14 |

TABLE 4

| PATH DETERMINATION SCHEME | DELIVERY SERVER SELECTION SCHEME | | |
|---|---|---|---|
| | Local (L) | Cooperate (C) | MPC (M) |
| Shortest (S) | 1.56 | 1.06 | 1.11 |
| MPC (M) | 1.65 | 1.08 | 2.11 |

From these tables, it is understood that the difference of the path determination scheme has little effect on the result and the delivery server selection scheme is a key factor to determine the average hop length of delivery flows. In both the NW, while Cooperate, in which a content item is obtained from the nearest cache server keeping possession of the content item, results in the shortest average hop length, the delivery server selection scheme according to MPC has a comparable effect.

<Effects of Embodiment of the Present Invention>

According to the embodiment of the present invention, it is possible to reduce a frequency with which a delivery request is rejected because of exceeding a delivery capacity of a cache server in a CDN where content is delivered using cache servers distributed among a plurality of nodes in the NW, by optimally designing a probability of selecting a cache server to be used for delivery or a probability of selecting a delivery route which is a combination of the cache server and a path in response to each delivery request.

For convenience of explanation, the design apparatus (the delivery server selection probability optimization design apparatus or the delivery route selection probability optimization design apparatus) according to the embodiments of the present invention has been described with reference to functional block diagrams, but the design apparatus may be implemented in hardware, software, or combinations thereof. For example, the embodiment of the present invention may be realized by a program for causing a computer to implement each function in the design apparatus according to the embodiment of the present invention, a program for causing a computer to perform each step in the method according to the embodiment of the present invention, or the like. In addition, two or more functional elements may be combined as appropriate.

While the solution is described above to reduce a frequency with which a delivery request from a user is rejected when delivery demand from users changes over time in a CDN and to improve a CDN service, the present invention is not limited to the embodiments, but various modifications and applications can be made by those skilled in the art within the scope of the claims.

The present international application is based on and claims the benefit of priority of Japanese Patent Application No. 2015-031523 filed on Feb. 20, 2015, the entire contents of which are hereby incorporated by reference.

DESCRIPTION OF NOTATIONS 100 design apparatus
101 parameter input unit 101
102 selection probability design unit
103 selection probability output unit
200 delivery server selection probability optimization design apparatus
201 parameter input unit
202 cache server selection probability optimization design unit
203 cache server selection probability output unit
300 delivery route selection probability optimization design apparatus
301 parameter input unit
302 delivery route selection probability optimization design unit
303 delivery route selection probability output unit

The invention claimed is:

1. A system for content delivery, wherein content is delivered using cache servers distributed among a plurality of nodes in a network, comprising:
processing circuitry; and
a memory that includes instructions, that when executed by the processing circuitry, cause the processing circuitry to
receive a request from a user terminal connected to the network for a content delivery item, and in response to the received request, the processing circuitry is configured to
receive, as input parameter values, at least a parameter related to the network, an estimated amount of demand for delivery requests generated by users for content, a group of cache servers which keep possession of the content delivery item, and a group of candidate paths from the cache servers to the user terminal;
design, based on the input parameter values, a selection probability that a cache server is selected as a delivery server for content delivery or a selection probability that a delivery route is selected, using model predictive control, wherein the model predictive control uses an objective function for reducing the number of excessive delivery requests, each of which is a delivery request generated by a user for a content item and then rejected, and said delivery route is a combination of the delivery server and a delivery path on which the content is delivered by the delivery server;
output the selection probability of the cache server or the selection probability of the delivery route, wherein the selection probability minimizes a frequency with which the request for the user terminal is rejected because of exceeding a capacity of a cache server, and
cause delivery of the requested content delivery item to the user terminal based on the outputted selection probability of the cache server or the selection probability of the delivery route.

2. The system as claimed in claim 1, wherein to design the selection probability of the cache server, the model predictive control further uses an objective function for reducing an average number of hops of delivery flows and an objective function for stabilizing a variation of the selection probability.

3. The system as claimed in claim 2, wherein the instructions cause the processing circuitry to receive the following parameters:
the number of content items M,
the number of nodes N,
a prediction horizon H for the model predictive control,
a cache server delivery capacity $C_{c,s}$ of a cache server s,
the estimated amount of demand $\hat{d}_{u,m,t}$ of the amount of delivery demand $d_{u,m,t}$ generated by the user terminal, as a user u, for a content item m, as the content delivery item, in a timeslot t,
the group of cache servers $S_{m,t}$ which keep possession of the content item m in the timeslot t,
the group of candidate paths $R_{s,u}$ from the cache server s to the user u,
a hop length $h_{s,u,k}$ from the cache server s to the user u in a timeslot k (t+1<=k<=t+H),
a weight parameter $w_h$ for the objective function $J_1$, for reducing the average number of hops of the delivery flows relative to the objective function $J_s$ for reducing the number of excessive delivery requests, and
a weight parameter $w_{v,p}$ for the objective function $J_{v,p}$ for stabilizing the variation of the selection probability $p_{u,m,k}(s)$ of the cache server s relative to the objective function $J_s$, and
calculate a total number of the delivery flows $g_{s,t}$ from the cache server s in the timeslot t as follows:

$$g_{s,t} = \sum_{m=1}^{M} \sum_{u=1}^{N} \sum_{r \in R_{s,u}} \hat{d}_{u,m,t} p_{u,m,t}(s) + \zeta_{s,t-1},$$

where $\zeta_{s,t-1}$ is the count number of excessive deliveries in the cache server s in a timeslot t−1 and $\zeta_{s,t-1}$ is calculated as $\zeta_{s,t-1}=[g_{s,t-1}-C_{C,s}]^+$ using an operator $[x]^+$ which outputs x if x>0 and outputs 0 if x<=0,
define the objective function $J_s$ as follows:

$$J_s = \sum_{k=t+1}^{t+H} \sum_{s=1}^{N} \zeta_{s,k},$$

also define the objective function $J_h$ as follows:

$$J_h = \sum_{k=t+1}^{t+H} \sum_{m=1}^{M} \sum_{u=1}^{N} \sum_{s \in S_{m,k}} h_{s,u,k} \hat{d}_{u,m,k} p_{u,m,k}(s),$$

also define the objective function $J_{v,p}$ as follows:

$$J_{v,p} = \sum_{k=t+1}^{t+H} \sum_{m=1}^{M} \sum_{u=1}^{N} \sum_{s \in S_{m,k}} |p_{u,m,k}(s) - p_{u,m,k-1}(s)|,$$

and optimize the selection probability $p_{u,m,k}(s)$ for the timeslot k (t+1<=k<=t+H) at an end of the timeslot t according to a nonlinear programming problem which minimizes $J_s + w_h J_h + w_{v,p} J_{v,p}$.

4. The system as claimed in claim 1, to design the selection probability of the delivery route, the model predictive control further uses an objective function for reducing a total number of delivery flows passing through a link, an objective function for reducing an average number of hops of the delivery flows, and an objective function for stabilizing a variation of the selection probability.

5. The system as claimed in claim 4, wherein the instructions cause the processing circuitry to
receive the following parameters:
the number of content items M,
the number of nodes N,
a prediction horizon H for the model predictive control,
a cache server delivery capacity $C_{C,s}$ of a cache server s,
a link transfer capacity $C_{L,e}$ of a link e,
a group of delivery routes $\Phi_{u,m,t}$ between the user terminal, as a user u, and a content item m, a the delivery content item, in a timeslot t,
the estimated amount of demand $\hat{d}_{u,m,t}$ of the amount of delivery demand $d_{u,m,t}$ generated by the user u for the content item m in the timeslot t,
a group of cache servers $S_{m,t}$ which keep possession of the content item m in the timeslot t,
a group of candidate paths $R_{s,u}$ from the cache server s to the user u,
a binary variable $I_{s,u,t}(r,e)$ which is equal to one if a candidate route r from the cache server s to the user u includes the link e in the timeslot t,
a hop length $h_{s,u,k}$ from the cache server s to the user u in a timeslot k (t+1<=k<=t+H),
a weight parameter $w_e$ for objective function $J_e$ for reducing the total number of delivery flows passing through the link e relative to the objective function $J_s$ for reducing the number of excessive delivery requests,
a weight parameter $w_h$ for the objective function $J_h$ for reducing the average number of hops of the delivery flows relative to the objective function $J_s$ for reducing the number of excessive delivery requests, and
a weight parameter $w_{v,\tilde{p}}$ for the objective function $J_{v,\tilde{p}}$ for stabilizing the variation of the selection probability $\tilde{p}_{u,m,t}(s,r)$ of the delivery route $\varphi_{u,m,t}(s,r)$ from a source s through a path r, and
calculate a total number of the delivery flows $f_{s,t}$ passing through the link e in the timeslot t as follows:

$$f_{e,t} = \sum_{m=1}^{M} \sum_{u=1}^{N} \sum_{s \in S_{m,t}} \sum_{r \in R_{s,u}} I_{s,u,t}(r,e) \hat{d}_{u,m,t} \tilde{p}_{u,m,t}(s,r) + \eta_{e,t-1},$$

where $\eta_{e,t-1}$ is the count number of excessive deliveries on the link e in a timeslot t−1 and $\eta_{e,t-1}$ is calculated as $\eta_{e,t-1} = [f_{e,t-1} - C_{L,e}]^+$ using an operator $[x]^+$ which outputs x if x>0 and outputs 0 if x<=0,
define the objective function Je as follows:

$$J_e = \sum_{k=t+1}^{t+H} \sum_{e=1}^{E} \eta_{e,k},$$

calculate a total number of the delivery flows $g_{s,t}$ from the cache server s in the timeslot t as follows:

$$g_{s,t} = \sum_{m=1}^{M} \sum_{u=1}^{N} \sum_{r \in R_{s,u}} \hat{d}_{u,m,t} p_{u,m,t}(s) + \zeta_{s,t-1},$$

where $\zeta_{s,t-1}$ is the count number of excessive deliveries in the cache server s in the timeslot t−1 and $\zeta_{s,t-1}$ is calculated as $\zeta_{s,t-1} = [g_{s,t-1} - C_{C,s}]^+$ using the operator $[x]^+$ which outputs x if x>0 and outputs 0 if x<=0,
define the objective function $J_s$ as follows:

$$J_s = \sum_{k=k+1}^{t+H} \sum_{s=1}^{N} \zeta_{s,k},$$

also define the objective function $J_h$ as follows:

$$J_h = \sum_{k=t+1}^{t+H} \sum_{m=1}^{M} \sum_{u=1}^{N} \sum_{s \in S_{m,k}} h_{s,u,k} \hat{d}_{u,m,k} p_{u,m,k}(s),$$

also define the objective function $J_{v,\tilde{p}}$ as follows:

$$J_{v,\tilde{p}} = \sum_{k=t+1}^{t+H} \sum_{m=1}^{M} \sum_{u=1}^{N} \sum_{s \in S_{m,k}} \sum_{r \in R_{s,u}} |\tilde{p}_{u,m,k}(s,r) - \tilde{p}_{u,m,k-1}(s,r)|,$$

and optimize the selection probability $\tilde{p}_{u,m,k}(s,r)$ for the timeslot k (t+1<=k<=t+H) at an end of the timeslot t according to a nonlinear programming problem which minimizes $J_s + w_e J_e + w_h J_h + w_{v,\tilde{p}} J_{v,\tilde{p}}$.

6. A design method in a system for content delivery, wherein content is delivered using cache servers distributed among a plurality of nodes in a network, comprising:
receiving a request from a user terminal connected to the network for a content delivery item, and in response to the received request, the method includes
receiving, as input parameter values, at least a parameter related to the network and an estimated amount of demand for delivery requests generated by users for content, a group of cache servers which keep possession of the content delivery item at a given time, and a group of candidate paths from the cache servers to the user terminal;
designing, based on the received input parameter values, a selection probability that a cache server is selected as a delivery server for content delivery or a selection probability that a delivery route is selected, using model predictive control, wherein the model predictive control uses an objective function for reducing the number of excessive delivery requests, each of which is a delivery request generated by a user for a content item and then rejected, and said delivery route is a combination of the delivery server and a delivery path on which the content is delivered by the delivery server;

outputting the designed selection probability of the cache server or the selection probability of the delivery route, wherein the selection probability minimizes a frequency with which the request for the user terminal is rejected because of exceeding a capacity of a cache server; and causing delivery of the requested content delivery item to the user terminal based on the outputted selection probability of the cache server or the selection probability of the delivery route.

7. A non-transitory computer-readable storage medium storing instructions, wherein content is delivered using cache servers distributed among a plurality of nodes in a network, the instructions, when executed by processing circuitry, causing the processing circuitry to perform a method comprising:

receiving a request from a user terminal connected to the network for a content delivery item, and in response to the received request, the method includes receive, as input parameter values, at least a parameter related to the network and an estimated amount of demand for delivery requests generated by users for content, a group of cache servers which keep possession of the content delivery item at a given time, and a group of candidate paths from the cache servers to the user terminal;

design, based on the input parameter values, a selection probability that a cache server is selected as a delivery server for content delivery or a selection probability that a delivery route is selected, using model predictive control, wherein the model predictive control uses an objective function for reducing the number of excessive delivery requests, each of which is a delivery request generated by a user for a content item and then rejected, and said delivery route is a combination of the delivery server and a delivery path on which the content is delivered by the delivery server;

outputting the designed selection probability of the cache server or the selection probability of the delivery route, wherein the selection probability minimizes a frequency with which the request for the user terminal is rejected because of exceeding a capacity of a cache server, and causing delivery of the requested content delivery item to the user terminal based on the outputted selection probability of the cache server or the selection probability of the delivery route.

* * * * *